(12) United States Patent
Shirwadkar et al.

(10) Patent No.: US 12,271,445 B2
(45) Date of Patent: Apr. 8, 2025

(54) ELECTRONIC INFORMATION EXTRACTION USING A MACHINE-LEARNED MODEL ARCHITECTURE METHOD AND APPARATUS

(71) Applicant: YAHOO ASSETS LLC, Dulles, VA (US)

(72) Inventors: Sanika Shirwadkar, Milpitas, CA (US); Nicolas Torzec, San Jose, CA (US); Kostas Tsioutsiouliklis, Saratoga, CA (US)

(73) Assignee: YAHOO ASSETS LLC, New York, NY (US)

( * ) Notice: Subject to any disclaimer, the term of this patent is extended or adjusted under 35 U.S.C. 154(b) by 351 days.

(21) Appl. No.: 18/050,563

(22) Filed: Oct. 28, 2022

(65) Prior Publication Data

US 2024/0143698 A1 May 2, 2024

(51) Int. Cl.
| | |
|---|---|
| G06F 18/21 | (2023.01) |
| G06F 16/93 | (2019.01) |
| G06N 3/045 | (2023.01) |
| G06N 3/08 | (2023.01) |

(52) U.S. Cl.
CPC ............ *G06F 18/217* (2023.01); *G06F 16/93* (2019.01); *G06N 3/045* (2023.01); *G06N 3/08* (2013.01)

(58) Field of Classification Search
CPC ...... G06F 16/906; G06F 16/93; G06F 18/217; G06N 3/045; G06N 3/08; G06N 3/082; G06N 3/084; G06N 5/01; G06V 10/774; G06V 10/82

See application file for complete search history.

(56) References Cited

U.S. PATENT DOCUMENTS

| | | | |
|---|---|---|---|
| 2018/0060738 A1* | 3/2018 | Achin | G06N 20/00 |
| 2018/0121533 A1* | 5/2018 | Magnani | G06N 3/045 |
| 2019/0034766 A1* | 1/2019 | Chen | G06V 10/82 |

(Continued)

OTHER PUBLICATIONS

Qiang Hao et al., "From One Tree to a Forest: a Unified Solution for Structured Web Data Extraction," Jul. 24, 2011, SIGIR '11: Proceedings of the 34th international ACM SIGIR conference on Research and development in Information Retrieval, pp. 775-782.*

(Continued)

*Primary Examiner* — Omar S Ismail
(74) *Attorney, Agent, or Firm* — James J. DeCarlo; Greenberg Traurig, LLP

(57) ABSTRACT

Techniques for automatic intelligent information extraction from an electronic document are disclosed. In one embodiment, a computerized method is disclosed comprising training a label prediction model to generate a set of label predictions, obtaining an electronic document, analyzing the electronic document and determining a set of features for each of a set of information items identified in the electronic document, obtaining model output from the label prediction model for each information item, the model output comprising, for a respective information item, a set of probabilities corresponding to a set of information classes, and generating an information extraction comprising a set of labels corresponding to the set of information items.

20 Claims, 8 Drawing Sheets

(56) References Cited

U.S. PATENT DOCUMENTS

| | | | |
|---|---|---|---|
| 2019/0050368 A1* | 2/2019 | Chen | G06N 20/10 |
| 2019/0095792 A1* | 3/2019 | Kashinath | G06N 20/20 |
| 2019/0205770 A1* | 7/2019 | Sathiaraj | G06N 5/02 |
| 2020/0143922 A1* | 5/2020 | Chekroud | G16H 20/10 |
| 2020/0357060 A1* | 11/2020 | Dalinina | G06F 18/213 |
| 2021/0125106 A1* | 4/2021 | Okamoto | G06N 7/01 |
| 2021/0183373 A1* | 6/2021 | Moritz | G06N 3/045 |
| 2021/0287116 A1* | 9/2021 | Chen | G06N 20/00 |
| 2021/0357680 A1* | 11/2021 | Chen | G06N 3/047 |
| 2021/0390392 A1* | 12/2021 | Lagos | G06N 3/08 |
| 2022/0343122 A1* | 10/2022 | Takeuchi | G06F 18/217 |

OTHER PUBLICATIONS

Bill Yuchen Lin et al.,"FreeDOM: A Transferable Neural Architecture for Structured Information Extraction onWeb Documents," Aug. 20, 2020, KDD '20: Proceedings of the 26th ACM SIGKDD International Conference on Knowledge Discovery & Data Mining,p. 1092-1097.*

Ning Zhou et al.,"A Hybrid Probabilistic Model for Unified Collaborative and Content-Based Image Tagging,"Nov. 9, 2010, IEEE Transactions On Pattern Analysis and Machine Intelligence, vol. 33, No. 7, Jul. 2011,Pp. 1281-1291.*

Colin Lockard et al., "CERES: Distantly Supervised Relation Extraction from the SemiStructured Web," Apr. 12, 2018,arXiv:1804.04635v1,pp. 1-10.*

Betina Antony et al.,"Content-based information retrieval by named entity recognition and verb semantic role labelling," Jan. 28, 2015,Journal of Universal Computer Science, vol. 21, No. 13 (2015),pp. 1831-1844.*

Ming-Hung Hsu et al.,"Efficient and Effective Prediction of Social Tags to EnhanceWeb Search,"May 5, 2011, Journal of the American Society for Information Science and Technology, 62(8), pp. 1473-1484.*

Hongtao Lin et al.,"Learning Dual Retrieval Module for Semi-supervised Relation Extraction," May 13, 2019, WWW '19: The World Wide Web Conference, pp. 1073-1082.*

Donghwa Kim et al.,"Multi-co-training for document classification using various document representations: TF-IDF, LDA, and Doc2Vec," Oct. 11, 2018, Information Sciences 477 (2019), pp. 15-25.*

Hamza Haruna Mohammed et al.,"Multi-Label Classification of Text Documents Using Deep Learning,"Mar. 19, 2021,2020 IEEE International Conference on Big Data,pp. 4681-4686.*

Rahul Agrawal et al., "Multi-Label Learning with Millions of Labels:Recommending Advertiser Bid Phrases for Web Pages," May 13, 2013,WWW '13: Proceedings of the 22nd international conference on World Wide Web,pp. 13-21.*

Lwin Khin Shar et al., "Web Application Vulnerability Prediction Using Hybrid Program Analysis and Machine Learning," Nov. 13, 2015, IEEE Transactions On Dependable and Secure Computing, vol. 12, No. 6, Nov./Dec. 2015,pp. 688-703.*

* cited by examiner

ELECTRONIC INFORMATION EXTRACTION USING A MACHINE-LEARNED MODEL ARCHITECTURE METHOD AND APPARATUS

FIELD OF THE DISCLOSURE

The present disclosure relates to improvements to information extraction systems and specifically to providing novel systems and methods providing web content information extraction using a machine-learned model architecture.

BACKGROUND

A large corpus of information is available in web content, such as for example web pages. Many messages transmitted via the web or other networks are machine generated messages. Moreover, a vast majority of the information found in web pages and messages transmitted electronically are templatic in nature. Unfortunately, templates can vary from one web site provider, or message sender host, to the next. Template variations can even be found across web pages of a single web site provider and across messages from a single message sender host.

SUMMARY

The present disclosure provides novel systems and methods for automatic intelligent information extraction using a novel machine-learned model architecture, or framework, that is scalable to accommodate new or updated templates and templates from various sources. Embodiments of the present disclosure pre-process a templatic web page written in a markup language, such as the Hypertext Markup Language (HTML) to identify potential core elements of the HTML web page. An electronic document, such as a web page, written in a markup language is structured and templatic in nature. The preprocessed output is fed as input to a deep learning neural network architecture (comprising a number of machine-learned models) trained to output label predictions. An information generator can be configured to generate final extractions by selecting best candidates among the model predictions. The information generator can enrich an extraction with additional predictions using common patterns observed across websites.

In order to generate (or extract) information from templatic web pages, prior extraction systems are based on manually-created extraction rules (e.g., xPath rules) or machine-learned extraction functions that are website-specific. Because these rules or functions are customized for a specific website (and even different web pages of a specific website), they do not work on other websites (or web pages) and need to be updated or retrained every time the structure of this website changes.

Embodiments of the present disclosure address this and other problems in the art and provide an automatic intelligent information extraction using a novel machine-learned model architecture. In accordance with one or more embodiments, the machine-learned model architecture is a deep learning neural network architecture. The novel deep learning neural network architecture disclosed herein is scalable to different web page structures and compositions. The architecture does not depend on understanding the HTML structure of web pages or identifying the specific HTML paths or tags used within them. The architecture can generalize over multiple websites/web pages and can adapt to changes in structure and composition of the websites/web pages.

A machine-learned (or machine learning) model trained in accordance with embodiments of the present disclosure can extract and label information from a web page of one web site (e.g., a first eCommerce web site) as well as extract and label information from a web page of another web site (e.g., a second eCommerce web site). The first and second web sites can use different templatic structures. The machine-learned model trained in accordance with one or more embodiments can be used to extract and label information from a number of electronic documents generated using different templates.

Disclosed systems and methods address problems inherent in prior approaches and provide automatic intelligent information extraction using a novel deep learning neural network architecture that is scalable to accommodate new or updated templates. The novel systems and methods disclosed herein can develop generalized machine-learned models that can extract information from multiple websites (e.g., that use different templates) without a need to systematically train the model on each website's corresponding template. By way of a non-limiting example, a machine-learned model trained on ecommerce websites A and B can be used to extract information from websites A, B, C and D even though the machine-learned model may not be specifically trained on websites C and D. This presents improvements to the timeliness of, and availability of, data automatically extracted from the web, which improves the functionality of other systems, such as and without limitation web search systems, knowledge graph construction systems, recommendation systems, online electronic commerce (ecommerce) systems, and the like.

In accordance with embodiments of the present disclosure, a preprocessor can be used to extract items of information from an electronic document (e.g., an electronic message, web page, etc.) and determine a set of features for each item of information. By way of a non-limiting example, each item of information can correspond to an element (e.g., an HTML element) and the set of features can comprise a text feature comprising information from the element (e.g., text bracketed by the elements opening and closing tags), a tag feature comprising information indicating the element's tag (e.g., the HTML tag), a positional feature indicating the position (e.g., line number, line and column numbers, character position, position in an HTML tree, spatial coordinates in the electronic, etc.) of the element in the electronic document, and a length feature indicating the length (e.g., number of words, n-grams, etc.) in the text feature's information.

In accordance with one or more embodiments, the output from the preprocessor can be fed as input to a machine-learned model (e.g., deep learning neural network architecture) trained using at least one machine learning algorithm. The machine-learned model can be a classification model implemented by the deep learning neural network architecture in accordance with one or more disclose embodiments. The machine-learned model can process the input (from the preprocessor) for a respective information item and provide corresponding label predictions as output.

By way of a non-limiting example, the machine-learned model can take a set of features for an information item (determined by the preprocessor's analysis of the electronic document) as input and provide a set of label predictions corresponding to a set of information classes. By way of a further non-limiting example, a label prediction (from the set of label predictions) corresponds to an information class (from the set of information classes) and indicates a likelihood that the information item belongs to the information class.

By way of another non-limiting example, assuming that the preprocessor's output is from parsing a web page comprising product information, the machine-learned model can be trained to provide, as output, a probability that the information item belongs to one of a set of classes, where the classes can be product name, product price, product category, product brand, other, etc. In this example, product name, product price, etc. can be considered to be labels, and the machine-learned model can be trained to output a probability for each label, where a label's probability indicates a likelihood that the label is representative of the information item given the input.

In accordance with one or more embodiments, the output of the machine-learned model can be used to generate an information extraction corresponding to the information item. By way of a non-limiting example, the information extraction can comprise identifying an information class (from the set of information classes) to which the information item belongs based on the set of label predictions comprising a set of probabilities corresponding to the set of classes. By way of another non-limiting example, the information generator can examine the label probabilities output by the machine-learned model and select a label that best represents the model input. By way of a further non-limiting example, the information generator can select the label with the highest probability relative to the probabilities of each other probability in the set of label predictions output by the machine-learned model. In accordance with embodiments of the present disclosure, the information generator can be configured to select final extractions for an electronic document input to the machine-learned model. By way of a non-limiting example, for each class of information to be extracted, the information generator can be configured to identify which elements in electronic document most likely contain that information (if any), given the models' predictions for all the elements in the electronic document.

In accordance with one or more embodiments, the selected label corresponds to an information class in the set of information classes. The information extraction can comprise associating the text from the text feature (extracted from the electronic document) with the information class corresponding to the selected label.

In accordance with one or more embodiments, the machine-learned model (a label prediction model) can be a deep learning neural network architecture trained using a training data set comprising extractions generated using extraction rules (e.g., XPath extraction rules). Of course, it should be apparent that the training data set can be generated using any technique for generating training data now known or later developed.

By way of a non-limiting example, the training dataset can comprise extractions from a number of electronic documents, such as and without limitation web pages. In accordance with one or more embodiments, the electronic documents can be processed using a preprocessor (such as the one used with embodiments of the present disclosure) and information items matching extraction rules can be tagged with labels indicated by the extraction rules. Any information items that do not match an extraction rule can also be labeled as "Other." In addition to a label, each information item can comprise a set of features. The resulting data comprising the extractions and corresponding labels can be used as the training data set to train the machine-learned model using at least one machine learning algorithm.

In accordance with one or more embodiments, the machine-learned model can be a multi-class classification model trained to classify each information item corresponding to an HTML element identified in an electronic document (e.g., a web page) as being one class of a set of classes. By way of a non-limiting example, in the case of a product-oriented classification, the classes can comprise product name, product price, product category, product brand or other. The "other" classification can be used in a case that none of the other classifications are considered to be applicable.

Embodiments of the present disclosure can be used to collect and organize information from an electronic document (or a corpus of electronic documents), where each item of information can be labeled (or associated with a label) with an information class (attribute, or attribute name) that can be used to identify (or define) the information. The information class (attribute, or attribute name) can correspond to one of the information classes in a set of information classes used in embodiments of the present disclosure. In effect, the identified information class (attribute, or attribute name) can be considered to be metadata corresponding to (and providing definition for) an information item.

It will be recognized from the disclosure herein that embodiments of the instant disclosure provide improvements to a number of technology areas, for example those related to systems and processes that handle or process electronic information, such as but not limited to, online electronic messaging systems, search engines, online advertising systems, online recommendation systems, product cataloging systems, knowledge graph construction systems, and the like. By way of a some non-limiting examples, embodiments of the present disclosure can be used to label information items used by these and other systems.

In accordance with one or more embodiments, a method is disclosed which includes training, by a computing device, a label prediction model to generate a set of label predictions; obtaining, by the computing device, from a corpus of electronic documents, an electronic document written in a markup language; analyzing, by the computing device, the electronic document and determining a set of features for each of a set of information items identified in the electronic document based on the analysis; obtaining, by the computing device, model output from the label prediction model for each information item of the set of information items, the model output comprising, for a respective information item of the set of information items, a set of probabilities corresponding to a set of information classes, a respective probability, in the set of probabilities, indicating a likelihood that the respective information item belongs to an information class, of the set of information classes, corresponding to the respective probability; and generating, via the computing device, an information extraction comprising a set of labels corresponding to the set of information items, the generating comprising, for the respective information item of the set of information items, identifying a label corresponding to one information class, of the set of information classes, based on the set of probabilities determined by the label prediction model using the set of features corresponding to the respective information item as model input.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic extraction of data from the web, or other information source.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 4:
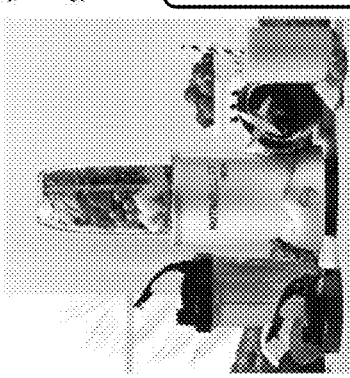
Figure 5:
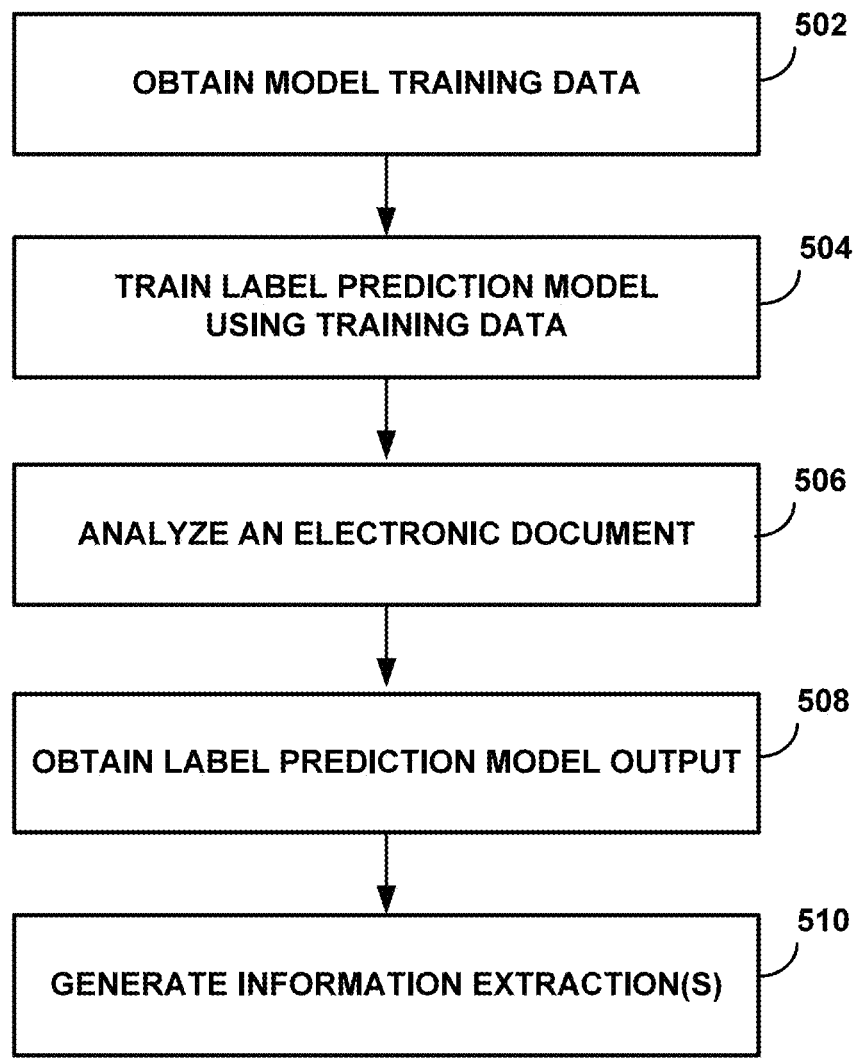
Figure 6:
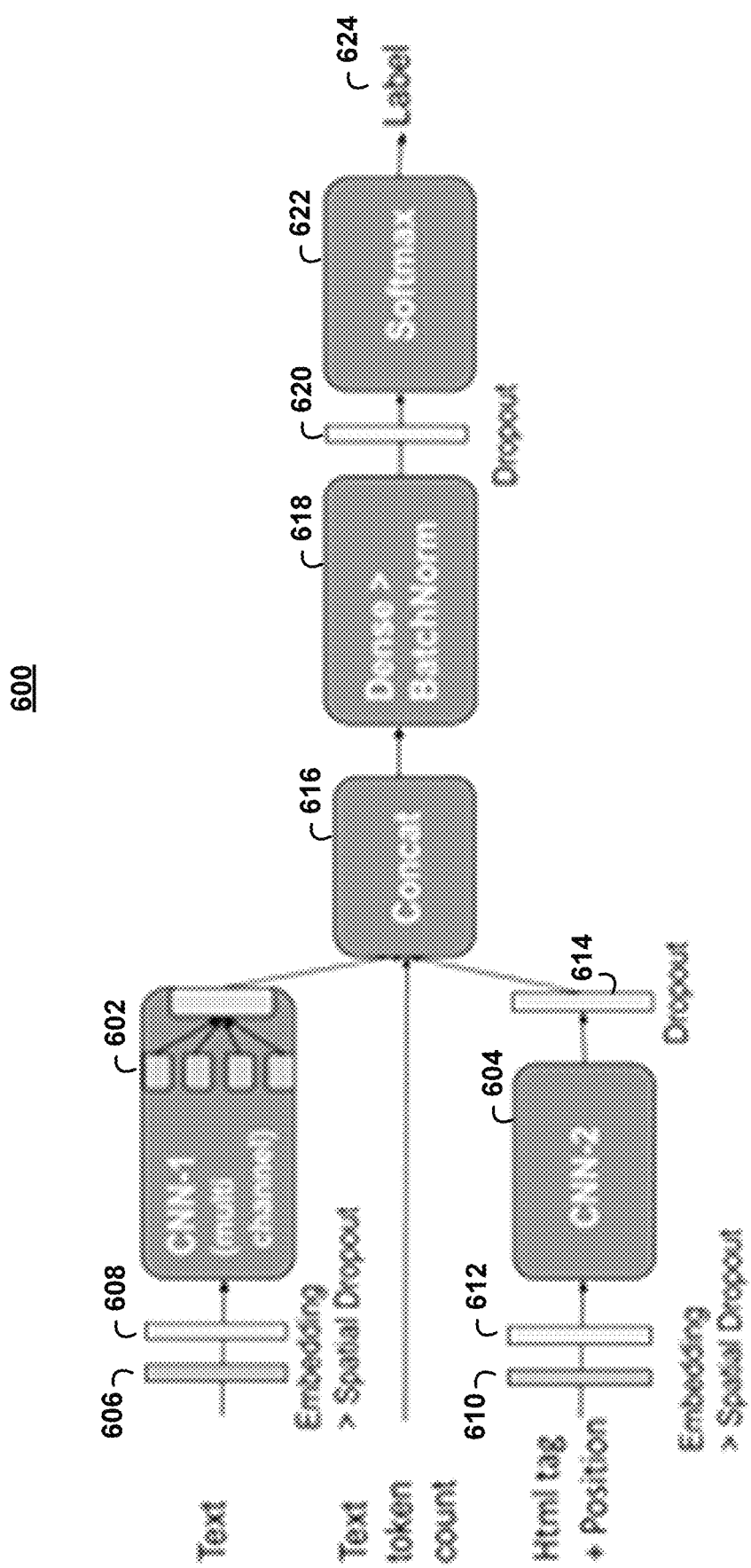
Figure 7:
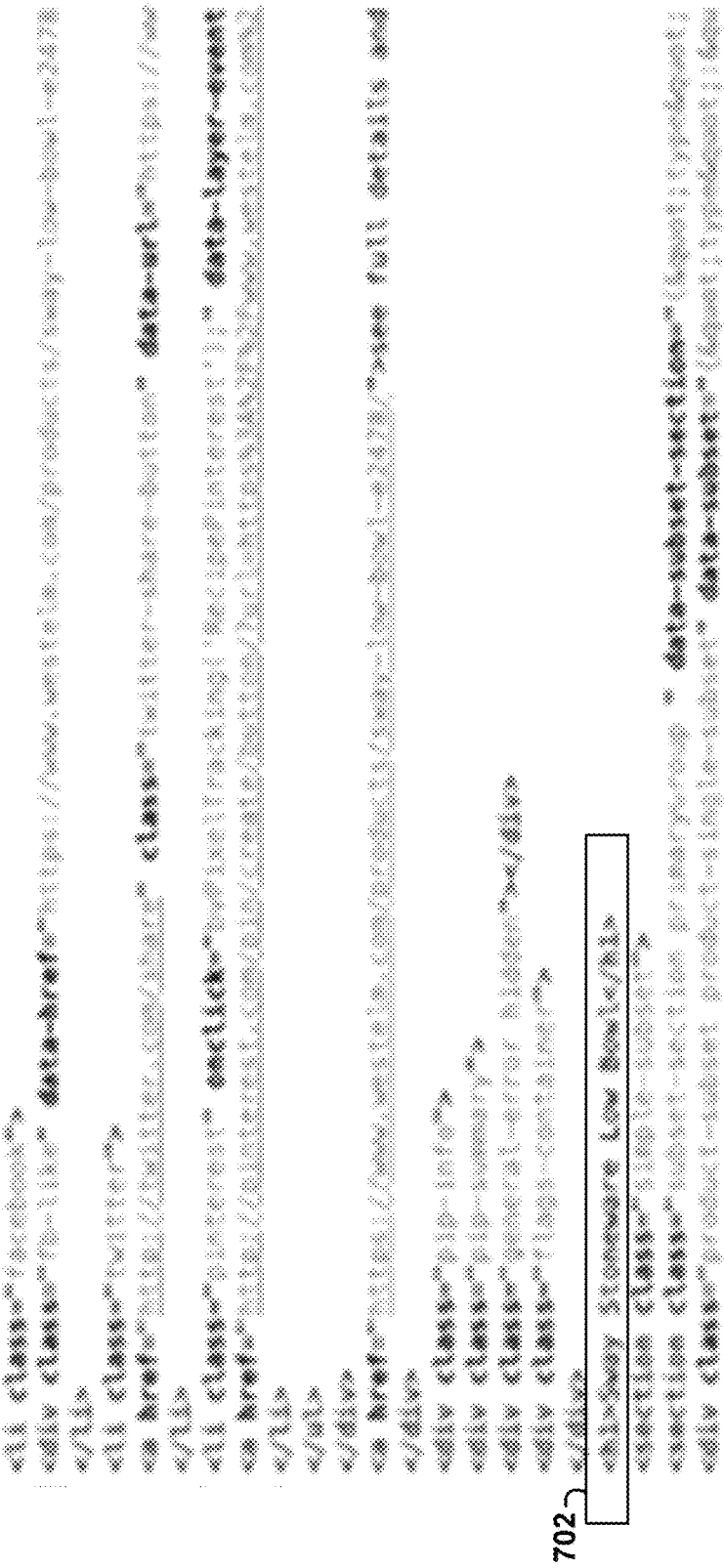
Figure 8:
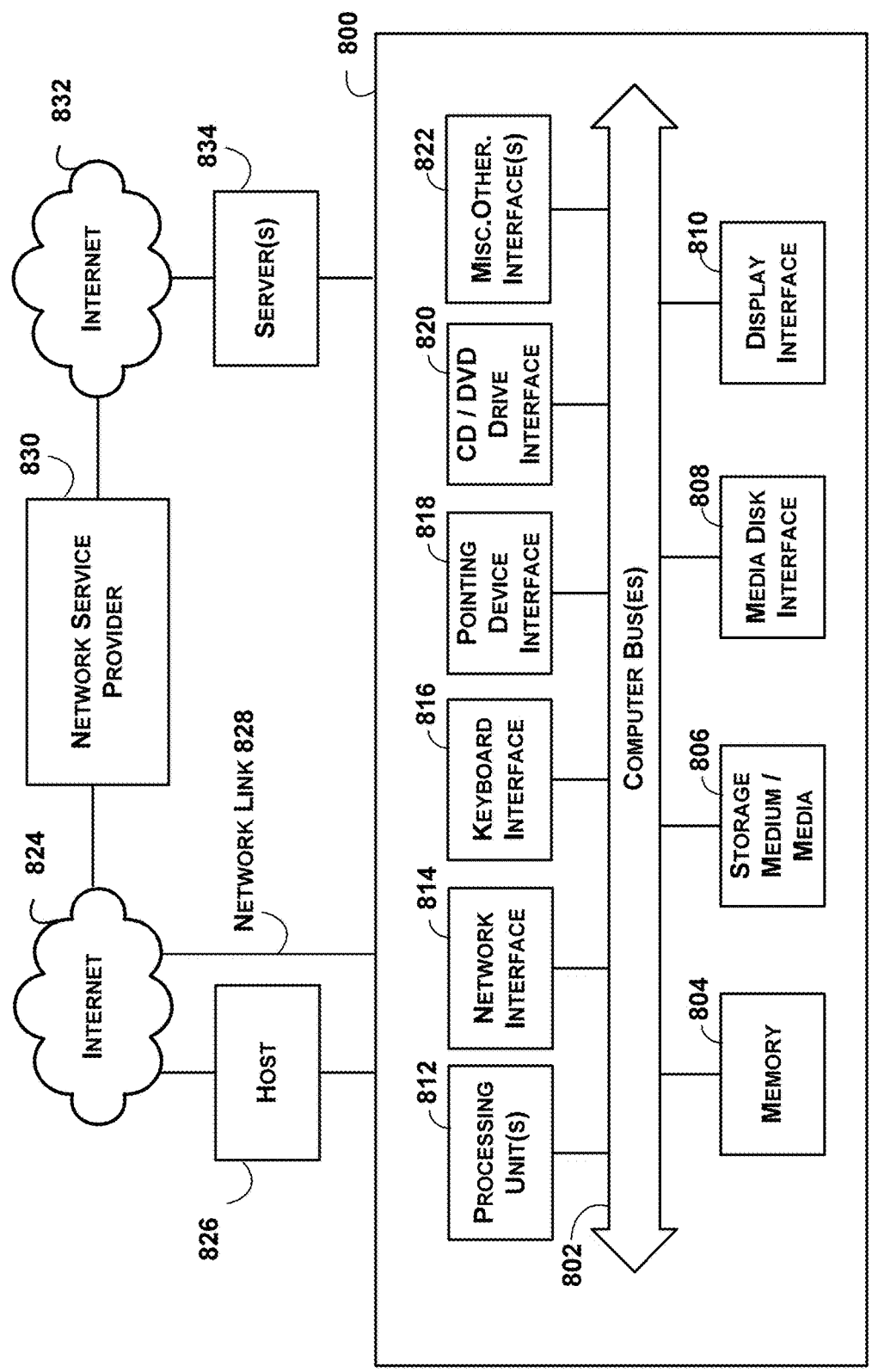

FIG. 4 provides an example of a web page that contains information that can be extracted using embodiments of the present disclosure;

FIG. 5 provides a process flow overview in accordance with one or more embodiments of the present disclosure;

FIG. 6 provides an example of a model architecture comprising at least one machine-learned model trained in accordance with one or more disclosed embodiments;

FIG. 7 provides an example of HTML from an electronic document for use in accordance with one or more embodiments of the present disclosure; and FIG. 8 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or $2^{nd}$, $3^{rd}$, or $4^{th}$ generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. While embodiments are described using a web page as an example, it should be apparent that embodiments of the present disclosure can be used with any type of document, including without limitation any document comprising markup-language (e.g., HTML) elements. In accordance with one or more embodiments, an electronic document can be textual, structured and templatic in nature.

Figure 1:
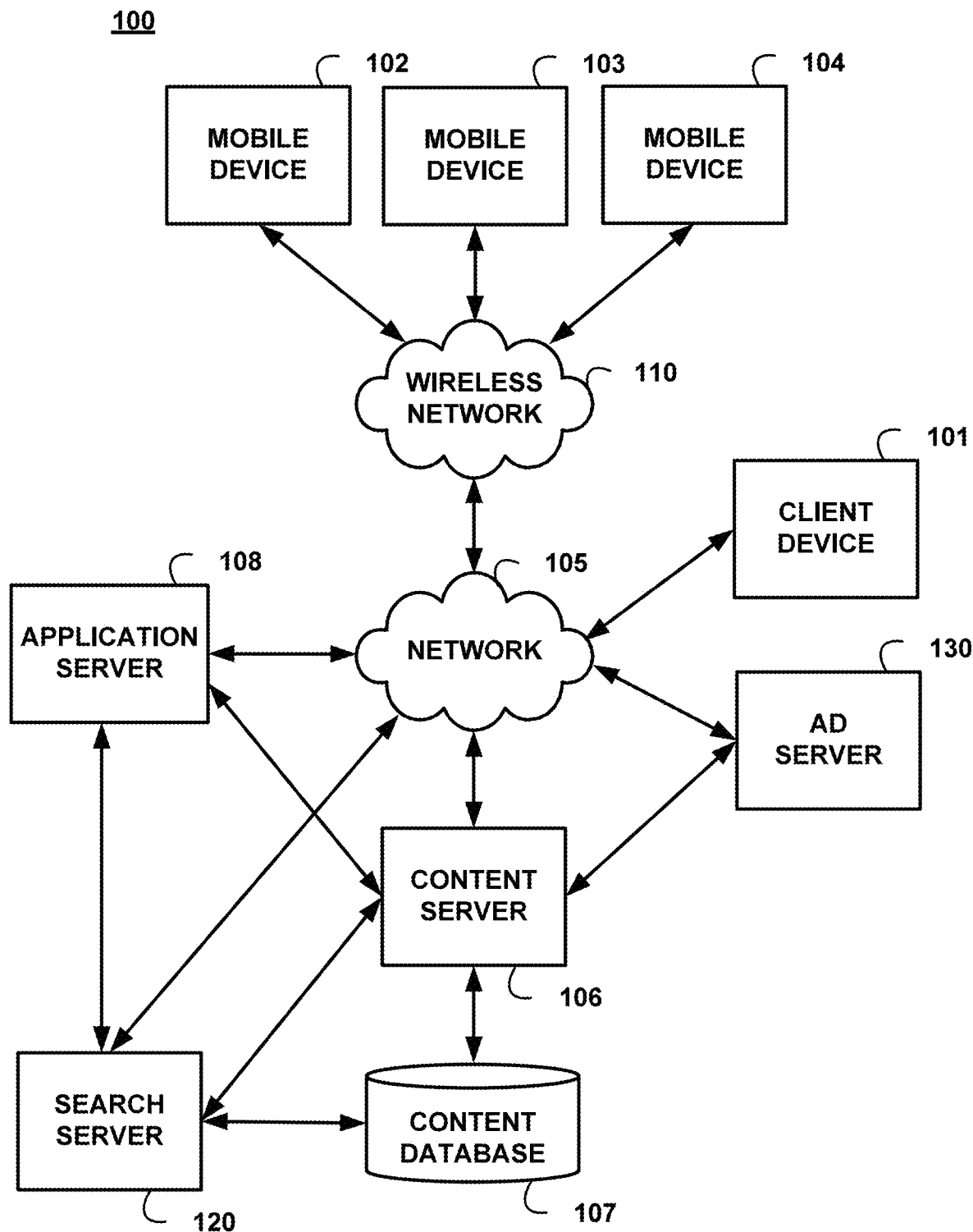
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information, thus client device 101 may also have differing capabilities for displaying navigable views of information.

Devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks, e.g. mesh networks, Wireless LAN (WLAN) networks, cellular networks, and the like.

Network 105 is configured to couple content server 106, application server 108, or the like, with other computing devices, including client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network, and may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include Ipv4 or Ipv6. The Internet refers to a decentralized global network of networks. The Internet includes local area networks (LANs), wide area networks (WANs), wireless networks, or long haul public networks that, for example, allow signal packets to be communicated between LANs.

According to some embodiments, the present disclosure may also be utilized within or accessible to an electronic social networking site. In some embodiments, multi-modal communications may occur between members of the social network. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with users. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, and comprise or one or more operating systems, such as Windows Server, Mac OS X, Unix, Linux, FreeBSD, or the like.

In some embodiments, users are able to access services provided by servers 106, 108 and/or 120. This may include, in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server 130 or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
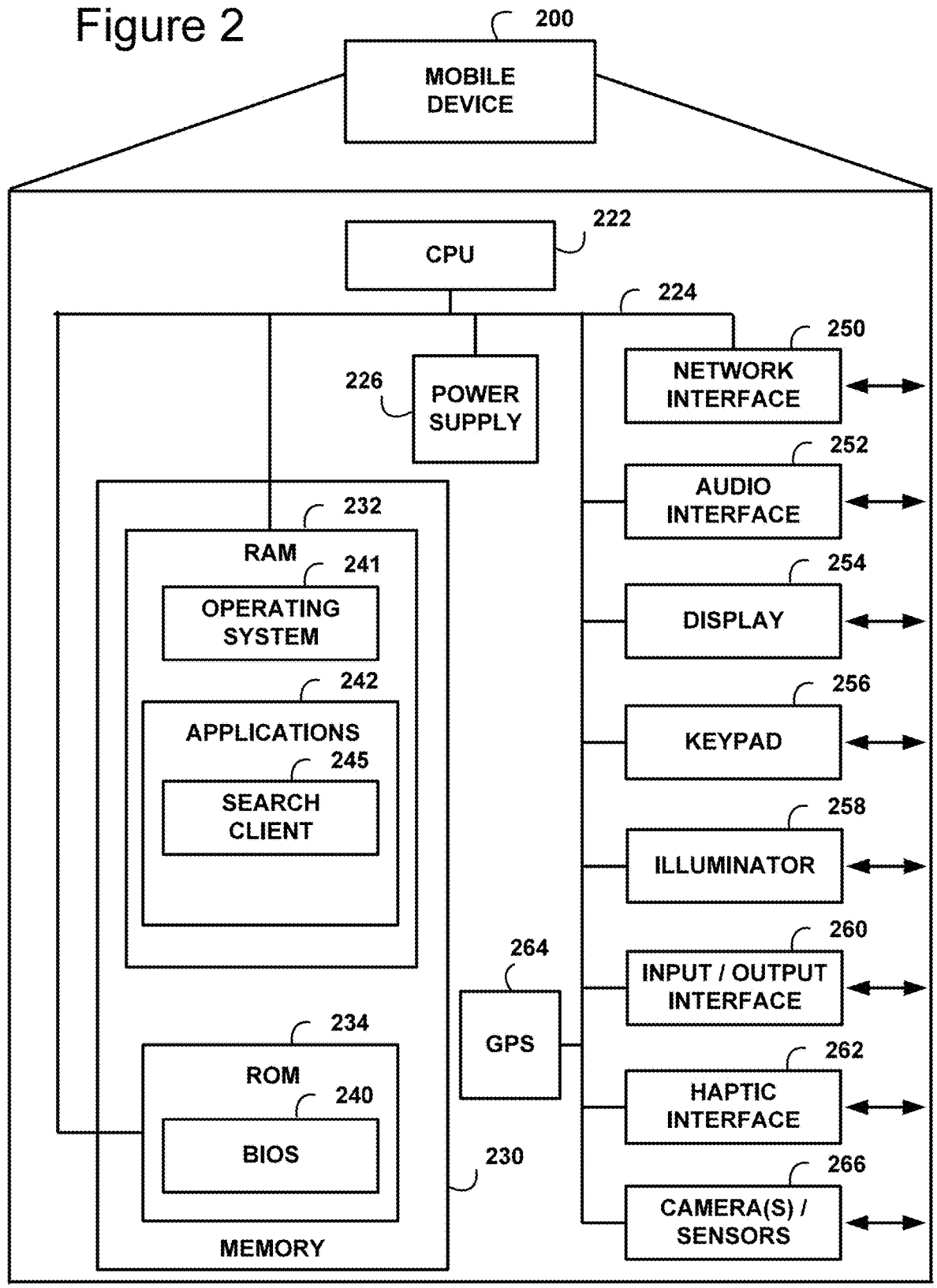
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) transceiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Device 200 may optionally communicate with a base station (not shown), or directly with another computing device. Network interface 250 includes circuitry for coupling device 200 to one or more networks, and is constructed for use with one or more communication protocols and technologies as discussed above.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like.

Applications 242 may include computer executable instructions which, when executed by device 200, transmit, receive, and/or otherwise process audio, video, images, and enable telecommunication with a server and/or another user of another client device. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, text messages, emails, and other types of known messages, or the like.

Figure 3:
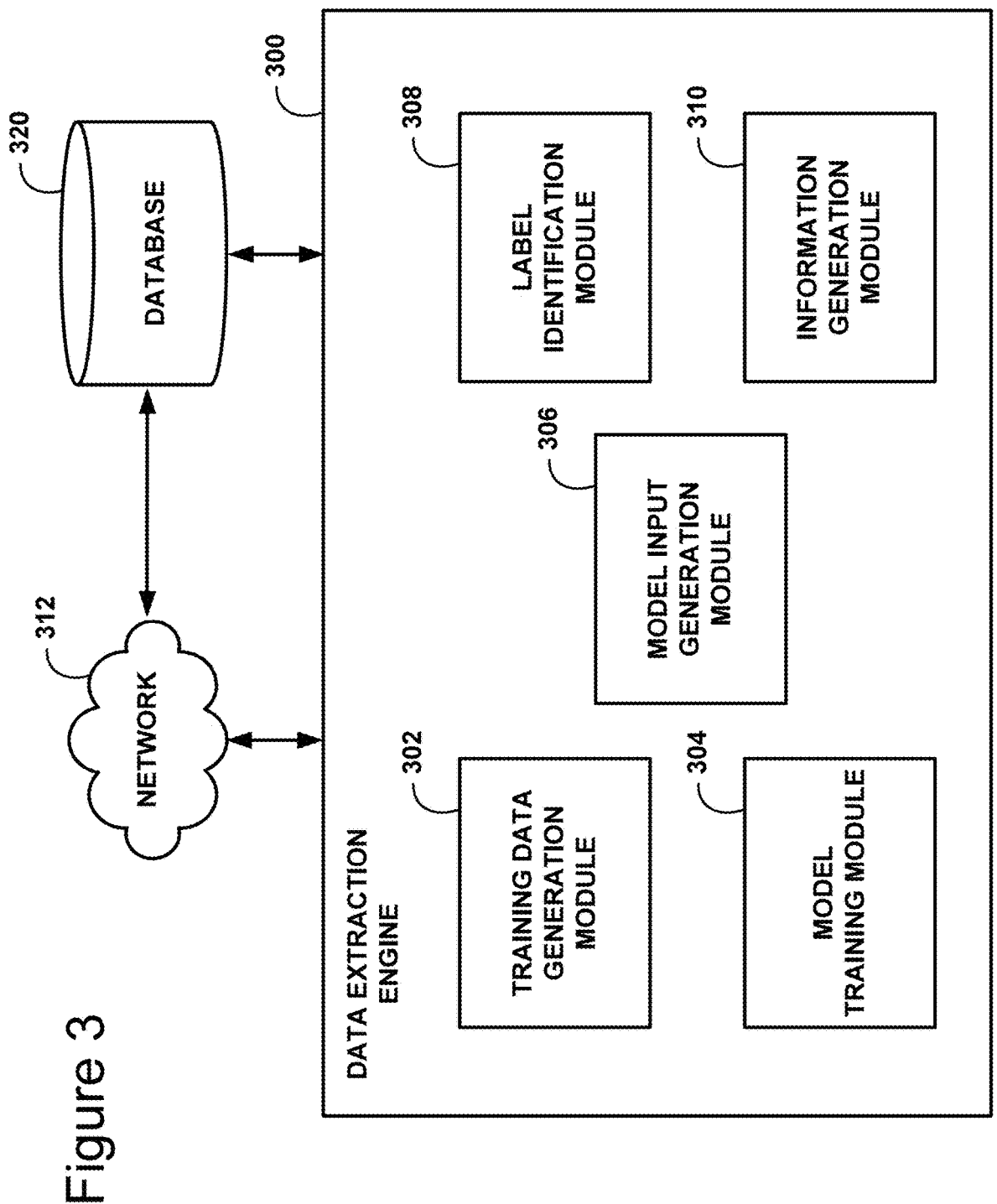
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes data extraction engine 300, network 312 and database 320. The engine 300 can be a special purpose machine or processor and could be hosted by an application server, content server, social networking server, web server, search server, content provider, email service provider, ad server, user's computing device, and the like, or any combination thereof.

According to some embodiments, the engine 300 can be embodied as a stand-alone application that executes on a computing device, user computing device, server computing device, etc. In some embodiments, the engine 300 can function as an application installed on the computing device, and in some embodiments, such application can be a web-based application accessed by the computing device over a network.

The database 320 can be any type of database or memory, and can be associated with a server on a network (such as and without limitation a content server, search server, application server, electronic messaging system server, etc.,) or a user's device.

Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

In some embodiments, the database 320 can include, for purposes of identifying, extracting and labeling information and generating attribute values, electronic documents, such as and without limitation, web pages, electronic messages, search queries, etc. In accordance with one or more embodiments, the database 320 can store, for a respective information item, an association between the information item (e.g., the text of an information item) and an information class identified in a manner discussed herein.

According to some embodiments, user data can be stored in database 320, which can include, but is not limited to, information associated with a user's profile, user interests, user behavioral information, user attributes, user preferences or settings, user demographic information, user location information, user biographic information, and the like, or some combination thereof. In some embodiments, at least some of the user profile data can be determined using the attribute and corresponding attribute values generated from data extracted from the electronic documents (e.g., electronic messages) in accordance with embodiments of the present disclosure. It should be understood that the data (and metadata) in the database 320 can be any type of information related to a user, content, a device, an application, a service provider, a content provider, whether known or to be known, without departing from the scope of the present disclosure.

The network 312 can be any type of network such as, but not limited to, a wireless network, a local area network (LAN), wide area network (WAN), the Internet, or a combination thereof. The network 312 facilitates connectivity of the engine 300, and the database of stored resources 320. Indeed, as illustrated in FIG. 3, the engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as engine 300, and includes training data generation module 302, model training module 304, model input generation module 306, label identification module 308 and information generation module 310. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 5.

As discussed in more detail below, the information processed by the engine 300 can be supplied to the database 320 in order to ensure that the information housed in the database 320 is up-to-date as the disclosed systems and methods leverage real-time information, as discussed in more detail below.

As discussed herein, in accordance with one or more embodiments, a number of information items can be extracted from an electronic document, such as a web page, where an information class (from a set of information classes) can be identified for each information item. As discussed herein and below, conventional information extraction approaches are unsatisfactory.

FIG. 4 provides an example of a web page that contains information that can be extracted using embodiments of the present disclosure. The web page shown in example 400 of FIG. 4 is a product web page including a number of items of information corresponding to the product, such as and without limitation: product title 402, brand 404, price 406, product category 408, etc. Other examples of items of information that might be of interest include the product details 410 and reviews 412.

It should be apparent that the product web page shown in example 400 is just one example of an electronic document. Embodiments of the present disclosure can be used to identify, extract and label information from various types of electronic documents.

As discussed herein, conventional approaches typically extract information using handwritten extraction rules generated by human editors. For example, human editors can use a DOM (Document Object Model) representation of a web page, in a collection of web pages, to define an Xpath expression for each HTML element containing information to be extracted.

In other words, manual approaches are based on template-specific handwritten extraction rules, which are expensive to scale to many websites due to the multitude of different HTML templates in use by the websites. Each website provider can use a number of different templates for their webpage. Additionally, different website providers can us different templates. As a result, each website's web pages (e.g., web page templates) must be reviewed by human editors that write customized extraction rules, which must be updated each time a corresponding template is changed, which happens frequently.

The present disclosure provides novel systems and methods for automatic intelligent information extraction using a novel deep learning neural network architecture that is scalable, where it can be used with different templates and can accommodate new or updated templates. An electronic document, such as a web page, written in a markup language can be textual, structured and templatic in nature. Embodiments of the present disclosure pre-process a templatic web page written in a markup language, such as the Hypertext Markup Language (HTML), to identify potential core elements of the HTML web page. Each identified HTML element can be used to generate an information item and a corresponding set of features. The preprocessed output (e.g., a set of features for an information item) can be fed as input to a deep learning neural network architecture trained to output a set of label predictions. The set of label predictions corresponding to a respective information item can be used to select a label (corresponding to one information class of a set of information classes) that best characterizes the respective information item. The selected label identifies the information class to which the extracted information is determined to belong. In accordance with one or more embodiments, information extraction can include associating (e.g., in a store such as the database 320) the text from the information item with the information class corresponding to the selected label.

FIG. 5 provides a process flow overview in accordance with one or more embodiments of the present disclosure. Process 500 of FIG. 5 details steps performed in accordance with exemplary embodiments of the present disclosure for automatic intelligent information extraction. According to some embodiments, as discussed herein with relation to FIG. 5 the process involves training a label prediction model (e.g., a deep learning neural network architecture) to generate a set of label predictions in connection with a respective information item from an electronic document, analyzing the electronic document to determine a set of information items and a set of features for each information item, using the trained label prediction model to determine a set of probabilities for each information item using each information item's determined set of features, and identifying a label associated with each information item using the information item's determined set of probabilities, as discussed in more detail below.

At step 502, which can be performed by training data generation module 302 of engine 300, training data can be obtained. By way of a non-limiting example, a training data set can comprise extractions, from a number of electronic documents (such as and without limitation web pages from a number of websites), generated using extraction rules (e.g., Xpath extraction rules). In accordance with one or more embodiments, the electronic documents can be processed using a preprocessor (such as the one used with embodiments of the present disclosure) and information items matching extraction rules can be tagged with labels indicated by the extraction rules. Any information items that do not match an extraction rule can also be labeled as "Other." In addition to a label, each information item can comprise a set of features, as discussed below.

In accordance with one or more embodiments, the preprocessor can be used to identify and retain potential core elements and filter out noisy elements, such as menu items, hidden elements, and anchor link clusters. The preprocessor can be used to improve model performance by optimizing the input that is sent to the model.

At step 504, which can be performed by model training module 304, a label prediction model (e.g., a deep learning neural network architecture) can be trained using the training data generated at step 502 and at least one machine learning algorithm. In accordance with one or more embodiments, the label prediction model can be trained to generate, for a given information item, a set of probabilities given a set of features determined for the information item. The set of probabilities generated for the information item can correspond to a set of information classes (or information classifications). The set of probabilities can comprise a probability for each information class. Each probability in the set corresponds to a respective information class (in the set of information classes) and can indicate a likelihood that the information item belongs to the information class corresponding to the probability.

In accordance with one or more embodiments, the trained machine-learned model can be a multi-class classification model trained to classify each information item corresponding to an HTML element identified in an electronic document (e.g., a web page) as being one information class of a set of information classes. By way of a non-limiting example, in the case of a product-oriented information classification, the information classes can comprise: product name, product price, product category, product brand or other. The "other" information classification can be used in a case that none of the other classifications are applicable.

FIG. 6 provides an example of a model architecture comprising at least one machine-learned model trained in accordance with one or more disclosed embodiments. FIG. 6 provides an example 600 of a model architecture used with one or more disclosed embodiments. The model architecture can comprise a number of convolutional neural networks (CNNs). A first CNN 602, or CNN-1, can be used to generate first intermediate modeling output. In accordance with one or more embodiments, CNN-1 can be a multi-channel CNN.

In accordance with one or more embodiments, CNN-1 can generate the first intermediate modeling output using first input. The first input can be based on a text feature (from a set of features) determined for a respective information item. In accordance with one or more embodiments, the first input can be generated by passing the text feature through an embedding layer 606 and a spatial dropout layer 608. By way of a non-limiting example, the embedding layer 606 can be a pre-trained fastText embeddings layer. Of course, any embeddings layer now known or later developed can be used with embodiments of the present disclosure.

Advantageously, an embeddings layer (e.g., a fastText embedding layer (or model)) can be used to construct embeddings of out-of-vocabulary (OOV) words. This is especially useful for tasks where there may be a considerable number of out of vocabulary words. One example of such a task that can involve a number of OOV words involve product information extraction. In accordance with one or more embodiments, embeddings layer 606 can be trained using text from electronic documents (e.g., templatic electronic documents), such as and without limitation retailer web pages, to generate word and sub-word embeddings.

A second CNN 604, or CNN-2, can be used to generate second intermediate modeling output. In accordance with one or more embodiments, CNN-2 can generate the second intermediate modeling output using second input. The second input can be based on the tag and positional features (from the set of features) determined for the respective information item. In accordance with one or more embodiments, the second input can be generated by passing the tag and positional features through an embedding layer 610 and a spatial dropout layer 612.

In accordance with one or more embodiments, the second intermediate modeling output can be passed through dropout layer 614 before being input to concatenator 616. In accordance with one or more embodiments, dropout layer 614 can be used to apply a high dropout level to reduce the dependency (by the label predictions model) on the tag and positional features. In evaluating the methodology used with the deep learning neural network architecture, it was empirically determined that the tag, positional and length features improved precision and recall (and the F1 metric that combines precision and recall metrics). It was also determined that a heavy dependence on the tag and positional features negatively impacts performance and reduces the generalizability (e.g., scalability) of the deep learning neural network architecture. Dropout layer 614 can provide a mechanism enabling integration of the tag and positional features (as model input) without sacrificing performance and generalizability (e.g., scalability).

Additionally, in evaluating the methodology, various techniques of integrating the tag, positional and length features as input to the model were evaluated. While the features can be integrated, as input to the architecture, by inputting each feature separately (without passing through an embedding layer), separately inputting each feature to the model after passing each feature through an embedding layer, creating shared embeddings (by passing various combinations of the features though an embedding layer), etc. It was empirically determined that inputting (integrating) the tag, positional and length features into the architecture as shown in example 600 of FIG. 6 was more effective than the other integration techniques evaluated.

As shown in example 600, the text feature is input separate from the tag, positional and length features. As discussed herein, the text feature is passed through embedding layer 606 and spatial dropout layer 608 before being input to CNN-1, and the tag and positional features are combined (e.g., concatenated) and passed through embedding layer 610 and spatial dropout layer 612 before being input to CNN-2.

As is further shown in example 600, the length feature is input (separate from the text, tag and positional features) to concatenator 616. In accordance with one or more embodiments, concatenator 616 can be used to concatenate the length feature (from the set of features) determined for the respective information item, the first intermediate modeling output and the second intermediate modeling output. Output layer 622 can use the concatenation generated by concatenator 616 to generate label output 624. In accordance with one or more embodiments, output layer 622 can be a dense softmax layer.

In accordance with one or more embodiments, label output 624 can be a set of label predictions comprising a set of probabilities for the respective information item. As discussed, the set of label predictions can comprise a set of probabilities corresponding to a set of information classes, where each probability in the set of probabilities corresponds to an information class in the set of information classes. For the respective information item, a respective probability (in the set of probabilities) can indicate a likelihood that the respective information item belongs to an information class, of the set of information classes, corresponding to the respective probability.

In accordance with one or more embodiments, the output of concatenator 616 can be passed through dense and batch normalization layers 618 and dropout layer 620 prior to being input to output layer 622.

Referring again to FIG. 5, at step 506, which can be performed by model input generation module 306, an electronic document (from a corpus of electronic documents) can be analyzed to identify a set of information items and a set of features for each identified information item. By way of a non-limiting example, the electronic document can be a Hypertext Markup Language (HTML) document, or other markup language.

By way of a further non-limiting example, a preprocessor, such as Python's lxml HTML parser, can be used to analyze the electronic document. In accordance with one or more embodiments, the analysis performed using the preprocessor can identify each information item corresponding to an HTML element. The preprocessor can generate, for each information item, a set of features using information from a corresponding HTML element.

As discussed, in accordance with one or more embodiments, the set of features can comprise text, tag, positional and length features. The text feature can comprise text extracted from within an HTML element, the tag feature can comprise information indicative of the tag corresponding to the HTML element, the positional feature can comprise information indicative of a position of the HTML element in the electronic document; and a length feature can comprise information indicative of a count of a number of tokens in text extracted from the HTML element.

FIG. 7 provides an example of HTML from an electronic document for use in accordance with one or more embodiments of the present disclosure. In accordance with one or more embodiments, the HTML in example 700 of FIG. 7 can be analyzed (e.g., by a parser such as and without limitation an lxml parser) to identify HTML elements. Portion 702 of the HTML in example 700 can be analyzed to identify an information item and a set of features for the information item.

In example 700, the text between the opening and closing "h1" HTML tags can be extracted for the text feature, where the text feature comprises the text corresponding to the "h1" HTML element. By way of a non-limiting example, a parser can extract the text, "Sway Stoneware Low Bowl", bracketed by the "<h1> and ">/h1> markers as the text feature corresponding to the information item represented in portion 702 of the HTML in example 700.

By way of a further non-limiting example, the parser can extract the element tag, "h1", for the tag feature, and can determine a position of portion 702 within the HTML in example 700. By way of a non-limiting example, the position can indicate a line number, e.g., 19. By way of a further non-limiting example, the position can include line number, line and column numbers, character position, position in an HTML tree, spatial coordinates in the electronic document, etc.

In addition, the parser can analyze the text extracted and used for the text feature to determine a length for the text feature. In accordance with one or more embodiments, the length can indicate the number of words, n-grams, etc. Using words from the text of the text feature, the length for the extracted text is 4 words.

In accordance with one or more embodiments, the parser can analyze the HTML in example 700, identify an information item and the corresponding set of features from portion 702. As discussed, the set of features for the identified information can correspond to an HTML element (such as the "h1" from portion 702) and have a determined set of features, where the set of features comprise a text feature (such as "Sway Stoneware Low Bowl" from within the opening and closing tags of the "h1" element), a tag feature (such as "h1" corresponding to the tag used in the opening and closing brackets for the HTML element), a positional feature (such as "line 19") indicating a position of the HTML element in the electronic document, and a length feature (such as: "4" words) indicating a number of words in the text feature.

Referring again to FIG. 5, at step 508 (which can be performed by label identification module 308), label prediction model output can be obtained. By way of a non-limiting example, the label prediction model output can be label output 624 from output layer 622. As discussed, label output 624 can correspond to a respective information item (such as that corresponding to portion 702 of example 700) and can comprise a set of probabilities. The set of probabilities can comprise a probability corresponding to each set of information classes, where the probability corresponding to a respective information class indicates a likelihood that the respective information item belongs to that information class.

At step 510, which can be performed by information generation module 310, a number of information extractions (corresponding to a number of information items generated for the electronic document analyzed at step 506) can be generated. By way of a non-limiting example, the information-extraction generation of step 510 can comprise, for a respective information item of the set of information items, identifying a label corresponding to one of the information classes, from the set of information classes, based on the set of probabilities determined by the label prediction model using the set of features corresponding to the respective information item as model input.

In accordance with embodiments of the present disclosure, information generation module 310 (or information generator) can be configured to select final extractions for an electronic document input to the machine-learned model. By way of a non-limiting example, for each class of information to be extracted, information generation module 308 can be configured to identify which elements in electronic document most likely contain that information (if any), given the models' predictions for all the elements in the electronic document.

By way of a further non-limiting example, the label output 624, for a respective information item, can comprise a set of label predictions comprising a set of probabilities, where each probability corresponds to an information class from the set of information classes. It should be apparent that any type of data structure (e.g., vector, array, etc.) can be used for the label predictions. The information class having a probability indicating the greatest likelihood can be identified and assigned to the information item, at step 510.

By way of a non-limiting example, a set of label predictions comprising a set of probabilities can be determined for each information item identified in an electronic document. As discussed, each such information item can have a corresponding set of features (e.g., determined at step 506), which can become input (e.g., at step 508) to the trained label prediction model (e.g., such as the model shown in example 600 of FIG. 6) to obtain (e.g., at step 508) label prediction output (e.g., label output 624). The label prediction output 624 can comprise a probability for each information class, where the probability corresponding to a respective information class indicates a likelihood that the information item belongs to the respective information class.

Using the "product name," "product price," "product category," "product brand" and "other" as an exemplary set of information classes and the set of features generated for the HTML portion 702 (from example 700 of FIG. 7) as an example, the label output 624 can comprise a set of probabilities for each information class, where the probability associated with the product name can have the highest likelihood (greatest probability) when compared to the other probabilities in the set of probabilities. A "product name" label can be associated with the text extracted from portion 702 (and used as the text feature in the information item's set of features).

Embodiments of the present disclosure can be used to extract information (e.g., text or other forms of information) from an electronic document and associate an identified label (as an attribute) to the extracted information. The label augments the extracted information and provides additional information about the extracted information.

As shown in FIG. 8, internal architecture of a computing system 800 includes one or more processing units, processors, or processing cores, (also referred to herein as CPUs) 812, which interface with at least one computer bus 802. Also interfacing with computer bus 802 are computer-readable storage medium, or media, 806, network interface 814, memory 804, e.g., random access memory (RAM), run-time transient memory, read only memory (ROM), media disk drive interface 808 as an interface for a drive that can read and/or write to media, display interface 810 as interface for a monitor or other display device, keyboard interface 816 as interface for a keyboard, pointing device interface 818 as an interface for a mouse or other pointing device, CD/DVD drive interface 820, and miscellaneous other interfaces (or Misc. Other Interface(s) 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein.

Persistent storage, e.g., medium/media 806, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at a display coupled to display interface 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 812 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
    training, by a computing device, a label prediction model to generate a set of label predictions;
    obtaining, by the computing device, from a corpus of electronic documents, an electronic document;
    analyzing, by the computing device, the electronic document and determining a set of features for each of a set of information items identified in the electronic document based on the analysis;
    obtaining, by the computing device, model output from the label prediction model for each information item of the set of information items, the model output comprising, for a respective information item of the set of information items, a set of probabilities corresponding to a set of information classes, a respective probability in the set of probabilities indicating a likelihood that the respective information item belongs to an information class of the set of information classes corresponding to the respective probability; and
    generating, via the computing device, an information extraction comprising a set of labels corresponding to the set of information items, the generating comprising, for the respective information item of the set of information items, identifying a label corresponding to one information class of the set of information classes based on the set of probabilities determined by the label prediction model using the set of features corresponding to the respective information item as model input.

2. The method of claim 1, wherein the electronic document written in a markup language and each information item corresponds to a markup-language element identified in the analysis of the electronic document.

3. The method of claim 2, wherein the set of features for the respective information item comprises:
    a text feature comprising text corresponding to a markup-language element corresponding to the respective information item;
    a tag feature comprising information indicative of a tag corresponding to the corresponding markup-language element;
    a positional feature comprising information indicative of a position of the corresponding markup-language element in the electronic document; and
    a length feature comprising information indicative of a length of the corresponding text.

4. The method of claim 3, further comprising:
    storing, by the computing device, for the respective information item, an association between the text of the text feature determined for the respective information item and the one information class corresponding to the label identified for the respective information item.

5. The method of claim 3, obtaining model output for the respective information item, of the set of information items, further comprising:
    generating, by the computing device, first intermediate modeling output using first input that is based on the text feature, from the set of features determined for the respective information item, and a first convolutional neural network (CNN) of a deep learning neural network architecture;
    generating, by the computing device, second intermediate modeling output using second input that is based on the tag and positional features, from the set of features determined for the respective information item, and a second CNN of the deep learning neural network architecture;
    generating, by the computing device, using a concatenator of the deep learning neural network architecture, a concatenation of the first intermediate modeling output, the second intermediate modeling output, and the length feature from the set of features determined for the respective information item; and
    generating, by the computing device, the set of probabilities for the respective information item using the concatenation and an output layer of the deep learning neural network architecture.

6. The method of claim 5, further comprising:
    generating, by the computing device, the first input to the first CNN, the generating comprising passing the text feature, from the set of features determined for the respective information item, through embedding and spatial dropout layers of the deep learning neural network architecture.

7. The method of claim 6, wherein the embedding layer is a pre-trained fastText embeddings layer.

8. The method of claim 5, further comprising:
passing, by the computing device, the concatenation through dense, batch normalization and dropout layers, of the deep learning neural network architecture, prior to providing the concatenation to the output layer.

9. The method of claim 5, further comprising:
passing, by the computing device, the tag and positional features, from the set of features determined for the respective information item, through an embedding layer and a spatial dropout layer to generate the second input to the second CNN.

10. The method of claim 5, generating the second intermediate modeling output further comprising:
applying, by the computing device, a dropout layer, of the deep learning neural network architecture, to the second intermediate modeling output prior to providing the second intermediate modeling output to the concatenator.

11. The method of claim 5, wherein the output layer comprises a dense softmax layer.

12. The method of claim 5, wherein the first CNN is a multi-channel CNN.

13. The method of claim 1, wherein the electronic document is a web page and the corpus of electronic documents comprises a corpus of web pages.

14. The method of claim 1, wherein the set of information classes comprises product name, product price, product category, product brand and other.

15. The method of claim 1, analyzing the electronic document further comprising:
using, by the computing device, a Hypertext Markup Language (HTML) parser to analyze the electronic document and determine the set of features for each information item in the set of information items identified in the electronic document based on the analysis, each information item corresponding to an HTML element identified by the HTML parser.

16. A non-transitory computer-readable storage medium tangibly encoded with computer-executable instructions that when executed by a processor associated with a computing device perform a method comprising:
training a label prediction model to generate a set of label predictions;
obtaining an electronic document from a corpus of electronic documents;
analyzing the electronic document and determining a set of features for each of a set of information items identified in the electronic document based on the analysis;
obtaining model output from the label prediction model for each information item of the set of information items, the model output comprising, for a respective information item of the set of information items, a set of probabilities corresponding to a set of information classes, a respective probability in the set of probabilities indicating a likelihood that the respective information item belongs to an information class of the set of information classes corresponding to the respective probability; and
generating an information extraction comprising a set of labels corresponding to the set of information items, the generating comprising, for the respective information item of the set of information items, identifying a label corresponding to one information class of the set of information classes based on the set of probabilities determined by the label prediction model using the set of features corresponding to the respective information item as model input.

17. The non-transitory computer-readable storage medium of claim 16, wherein the set of features for the respective information item comprises:
a text feature comprising text corresponding to a markup-language element, from the electronic document, corresponding to the respective information item;
a tag feature comprising information indicative of a tag corresponding to the corresponding markup-language element;
a positional feature comprising information indicative of a position of the corresponding markup-language element in the electronic document; and
a length feature comprising information indicative of a length of the corresponding text.

18. The non-transitory computer-readable storage medium of claim 17, the method further comprising:
storing, by the computing device, for the respective information item, an association between the text of the text feature determined for the respective information item and the one information class corresponding to the label identified for the respective information item.

19. The non-transitory computer-readable storage medium of claim 16, wherein the electronic document is a web page and the corpus of electronic documents comprises a corpus of web pages.

20. A computing device comprising:
a processor; and
a non-transitory storage medium for tangibly storing thereon program logic for execution by the processor, the program logic comprising:
training logic executed by the processor for training a label prediction model to generate a set of label predictions;
obtaining logic executed by the processor for obtaining an electronic document from a corpus of electronic documents;
analyzing logic executed by the processor for analyzing the electronic document and determining a set of features for each of a set of information items identified in the electronic document based on the analysis;
obtaining logic executed by the processor for obtaining model output from the label prediction model for each information item of the set of information items, the model output comprising, for a respective information item of the set of information items, a set of probabilities corresponding to a set of information classes, a respective probability in the set of probabilities indicating a likelihood that the respective information item belongs to an information class of the set of information classes corresponding to the respective probability; and
generating logic executed by the processor for generating an information extraction comprising a set of labels corresponding to the set of information items, the generating comprising, for the respective information item of the set of information items, identifying a label corresponding to one information class of the set of information classes based on the set of probabilities determined by the label prediction model using the set of features corresponding to the respective information item as model input.

* * * * *